United States Patent
Stuart et al.

(10) Patent No.: US 7,024,632 B1
(45) Date of Patent: Apr. 4, 2006

(54) TRADING PLATFORM USER INTERFACE IN A MANY-TO-MANY HUB

(75) Inventors: Erik A. Stuart, Los Altos Hills, CA (US); Eric J. Germa, Palo Alto, CA (US); Gregory Scott Clark, Hillsborough, CA (US)

(73) Assignee: E2Open, Inc., Redwood City, CA (US)

(*) Notice: Subject to any disclaimer, the term of this patent is extended or adjusted under 35 U.S.C. 154(b) by 745 days.

(21) Appl. No.: 10/124,603

(22) Filed: Apr. 16, 2002
(Under 37 CFR 1.47)

Related U.S. Application Data

(60) Provisional application No. 60/284,357, filed on Apr. 16, 2001.

(51) Int. Cl.
*G06F 3/00* (2006.01)

(52) U.S. Cl. .................. 715/764; 715/780; 715/781; 715/765; 715/866; 715/962; 705/26; 705/37

(58) Field of Classification Search ................ 715/764, 715/765, 866, 962; 705/26, 37
See application file for complete search history.

(56) References Cited

U.S. PATENT DOCUMENTS

| | | | |
|---|---|---|---|
| 5,497,317 A | | 3/1996 | Hawkins et al. |
| 5,890,138 A | * | 3/1999 | Godin et al. .................. 705/26 |
| 6,064,981 A | * | 5/2000 | Barni et al. .................... 705/26 |
| 6,415,270 B1 | * | 7/2002 | Rackson et al. .......... 705/36 R |
| 2002/0007324 A1 | * | 1/2002 | Centner et al. ............... 705/26 |
| 2002/0032640 A1 | | 3/2002 | LaFore et al. |
| 2005/0114229 A1 | * | 5/2005 | Ackley et al. ................ 705/26 |

FOREIGN PATENT DOCUMENTS

| | | |
|---|---|---|
| WO | WO 99/27477 A1 | 6/1999 |
| WO | WO 00/52619 A1 | 9/2000 |
| WO | WO 02/01473 A1 | 1/2002 |

OTHER PUBLICATIONS

Descartes.com. "Inventory Demand Matcher", Descartes Products, Sep. 16, 2002.

* cited by examiner

*Primary Examiner*—Cao (Kevin) Nguyen
*Assistant Examiner*—Michael Roswell
(74) *Attorney, Agent, or Firm*—Swernofsky Law Group PC

(57) ABSTRACT

The invention provides a user interface, such as used by an electronic trading hub. The interface includes a representation that describes instances in which a participant has won some units, but less than the number of items initially bid on. The representation of this partial win is displayed on web pages that present information to a user. Another representation shows start and end times for at least some of the markets in which the user is currently participating, and the start and end times for future markets. Color-coding of temporal events may also be included in the graphical representation. A representation of activities occurring in markets owned by a user is generated and displayed. Such representations useful to commercial entities which take positions as both buyers and sellers. Another representation identifies which type of market is referred to such as English auctions, RFBs (request for bids), Dutch auctions and others.

14 Claims, 3 Drawing Sheets

TRADING PLATFORM USER INTERFACE IN A MANY-TO-MANY HUB

This application claims the benefit of U.S. Provisional Application No. 60/284,357 filed Apr. 16, 2001 hereby incorporated by reference.

BACKGROUND OF THE INVENTION

1. Field of the Invention

This invention relates to display and presentation of information concerning collaborative planning and supply chain management.

2. Related Art

Supply chain management, collaborative design, electronic auctions and other trading systems frequently require a complex user interface to present information about one or more particular collaborators, trading partners or markets to a user. However, such interfaces may be unnecessarily complex or "user unfriendly". For example, in the absence of an easily comprehensible trading platform user interface, the user may be uncertain as to the status of bids that have been made for particular items. Similarly, the user may also be uncertain as to the anticipated duration of bidding. Frequently, these problems restrict the overall efficiency of supply chain management and collaborative design. In particular, the following data may not be available or may not be easy to locate:

- Tables of markets that include sufficient information such as lot size and part number
- information on the status of a user's bid
- when the "end time" of trading occurs or when a market closes, or when different phases of a market may start or end
- personal information regarding current negotiations
- personal information regarding past negotiations
- calculation of total units bid for and total price committed
- other individual information.

SUMMARY OF THE INVENTION

The invention provides an integrated, adaptable trading partner platform user interface, such as may be presented by an electronic trading hub to a user. In one embodiment, this interface is adapted to transactions involving electronic and computer components.

In one aspect of the invention, the interface includes a graphical representation that describes instances in which a participant in an auction has won some, but less than the total number of items that they were bidding on. For example, if the participant in an auction bid on ten hard drives and was outbid on six of those hard drives, then that participant has partially won the event because the participant's bids on four of the ten hard drives were successful. In a second example, a seller may wish to auction off a plurality of items at a particular price. In this second example, the graphical representation of a partial win is used to illustrate instances in which the seller has successfully sold some part of a total quantity at or above a particular price. In both of these examples, the graphical representation of this partial win is displayed on one or more web pages associated with the electronic hub. These pages may include summaries of the user's transactions, summaries of bids at one or more on-line auctions from a buyer's view, summaries of an one or more events at an on-line auction from a seller's view, and other similar pages such as may be used to present information to a user.

In another aspect of the invention, a different graphical presentation is used to show starting times and ending times for at least some of the markets in which the user is currently participating, and the start times and end times for at least some future markets in which the user is likely to be interested, to which the user is invited or some combination of other future markets. In this context, the term "market" refers to one or more particular auctions, negotiations or trading events relating to a quantity of an item of interest to either a buyer or seller. Further color-coding of temporal events (for example, when an auction goes into overtime, or the start and end of different phases of a multi-phase event) or other indicators such as blinking, may also be included in the graphical representation. This graphical representation is included in at least one web page provided by the hub relating to a summary of information relating to a particular user. This graphical representation can be used to represent ending times that are particularly ambiguous or unknown (for example, the end time of a Dutch auction).

In another aspect of the invention, a tabular representation of activities occurring in markets owned by a user is generated and displayed. This is a very different view than representations that reflect the user's status as an invited buyer or seller (i.e., a participant who doesn't "own" the market—usually, a buyer in a selling auction, or a seller in an auction representing a request to purchase). Such representations are particularly useful to large commercial entities which take positions as both buyers and sellers. Summarizing all sales and purchases in tabular form on behalf of a market owner is particularly beneficial for parties engaged in supply acquisition on behalf of the owner.

In another aspect of the invention, a graphical representation identifies which type of market is referred to. For example, different graphical representations are used to describe English auctions, op en RFBs (request for bids), Dutch auctions, sealed RFBs and other negotiations. This graphical representation is used in tables on web pages such as may be generated by an electronic hub to summarize information for a user.

In another aspect of the invention, the turn of the bidders in a negotiation is represented. In one embodiment, this representation is engagement specific. An engagement includes a set of offers and counter-offers between a specific pair of parties in a negotiation. This engagement-specific representation indicates that it is the bidder's turn with respect in that engagement. This prevents confusion and unnecessary delay as to which party should be bidding. In another embodiment, a negotiation-wide representation showing the turn of a particular bidder indicates that it is a particular bidder's turn if it is that bidder's turn in any of the markets in which that bidder is involved. In other embodiments, the representation showing the turn of a particular bidder is responsive to aggregated information about that bidder. In such other embodiments, the representation indicates that it is that bidder's turn only if it is actually that bidder's turn in a minimum number of markets. Other embodiments of this feature are also possible and are within the scope of the invention.

DESCRIPTION OF THE PREFERRED EMBODIMENT

The invention is described herein with regard to preferred steps and data structures. Those skilled in the art will recognize, after perusal of this application, that the described steps and data structures are not limited to any particular processing devices (whether general-purpose or special-purpose processing devices, or specific circuitry). Rather, those of ordinary skill in the art would be able to implement the described steps and data structures, and equivalents thereof, without undue experimentation or further invention. All such implementations are within the scope and spirit of the invention.

Inventions described herein can be used in conjunction with inventions described in the following applications:

application Ser. No. 09/823,888, filed Mar. 30, 2001, in the name of inventor Gregory Clark, titled Private Collaborative Planning in a Many to Many Hub application Ser. No. 10/087,444, filed Mar. 1, 2002, in the name of inventor Erik Stuart, titled "On-Line Auction with Different Rules Applicable to Different Phases"

application Ser. No. 09/967,905, filed Sep. 28, 2001, in the name of inventor Gregory Clark, titled "Method for Business to Business Collaborative Viral Adoption"

application Ser. No. 09/967,907, filed Sep. 28, 2001, in the name of inventor Gregory Clark, titled "Securing Information in a Design Collaboration and Trading Partner Environment", in the name of inventor Gregory Clark.

These applications are hereby incorporated by reference as if fully set forth herein. They are collectively referred to as the "incorporated disclosures".

System Elements

Figure 1:
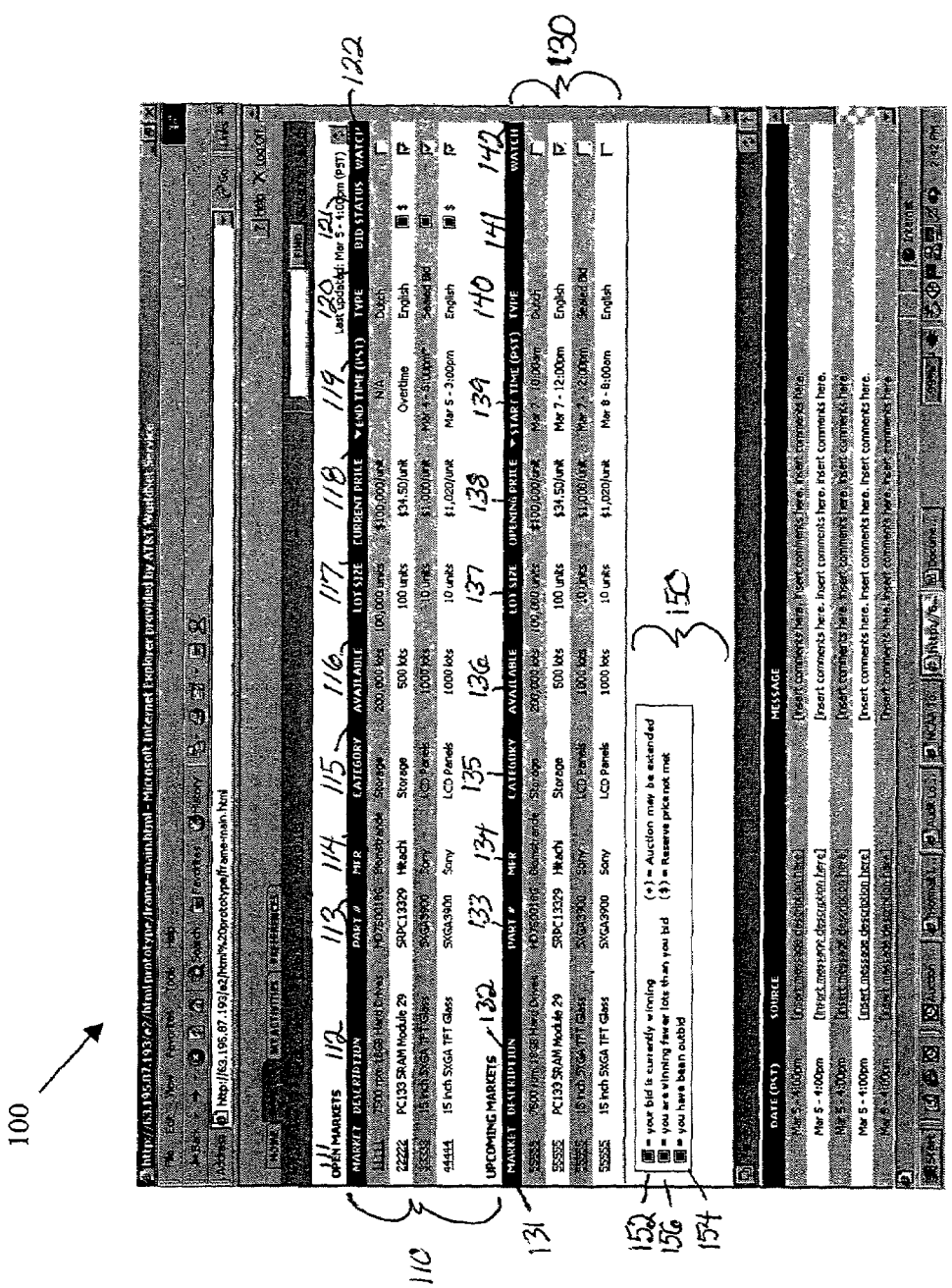
FIG. 1 shows an exemplary web page that includes a graphical representation of the status of a bidding event that involves a partial win.

FIG. 1 shows an exemplary web page that includes a graphical representation of the status of a bidding event that involves a partial win.

A web page 100 includes a presentation of a set of open markets 110, a presentation of a set of upcoming markets 130 in which a trading partner has bid or is likely to be interested to bidding, and a graphical representation 160 showing the current status of the bid. In this context, "market" refers to a particular event of selling an offered quantity of a good, service, or bundle of goods and services, or a particular event of requesting to purchase a desired quantity of a good, service, or bundle of goods and services.

The set of open markets 110 includes a table of information relating to markets in which bidding is actively taking place. This table of information includes data fields for at least some of the following parameters: the market number 111, description 112, part number 113, manufacturer 114, category 115, availability 116, lot size 117, current price 118, end time 119, type of market 120, bid status 121 and watch 122. In one embodiment, the user can sort information based upon any of these parameters.

The market number 111 refers to a code used by the hub to identify a particular market. The description 112 includes a brief description of the item being sold. The part number 113 includes a number used to identify a particular good. In one embodiment, the part number 113 is provided by the manufacturer of the good. In other embodiments, the part number 113 is provided by the hub. The category 115 of the event includes a broad description of the good. Examples of categories include storage, LCD panels, and other broad descriptors. The availability 116 describes how many of the items are being sold. The lot size 117 describes number of items in the units being sold. For example, a seller offers to sell 100 disk drives, in 10 lots of 10 drives each. Absent other information from a seller, s buyer would have to buy a whole number of lots—they could not buy 5 drives or 25 drives. Specifying lot size resolves problems associated with orders that include quantities that are not measured in whole lots. Information associated with lot size 117 helps the buyer understand exactly how many items they will receive so that a bid can be tailored accordingly. The current price 118 includes the price at which the good is presently available. During the course of an auction, the current price 118 will change in response to the bidding. The end time 119 specifies when a market will close. The end time 119 may be expressed as a date, a time, or some combination of both. The type of market 120 indicates the nature of the market (for example, a Dutch auction, an English auction, open RFBs (request for bids), sealed RFBs or other market types). The bid status 120 refers to whether the bidder has won, lost or partially won the bidding in a particular market. In one embodiment, the bid status 120 may change during the course of the bidding. Watch 121 provides information about a market without the user necessarily bidding. For example, a user may choose to watch a particular market for a period of time before actually bidding.

The set of upcoming markets 130 includes information relating to markets in which the bidding has not yet begun. This information relates to at least some of the following parameters: the market number 131, description 132, part number 133, manufacturer 134, category 135, availability 136, lot size 137, current price 138, end time 139, type of market 140, bid status 141 and watch 142. In one embodiment, the user can sort information based upon any of these parameters. Descriptions of these parameters are similar to those parameters associated with the set of open markets 110. However, the information associated with current price 138 does not reflect bidding because bidding has not yet begun. There may be no information associated with current price 138 or the information associated with current price 138 reflects an intended start price. There is no information associated with bid status 141 because bidding has not yet begun.

The graphical representation 150 includes a winning bid box 152, an outbid box 154 and a partial win box 156. The winning bid box 152 is used to graphically represent a winning bid status. The outbid box 154 is used to graphically represent those markets in which the user has been outbid. The partial win box 156 is used to graphically represent those markets in which the trading partner has achieved a partial win. The partial win is used when the user has won some, but not all of the items in a particular market that were initially bid upon.

The graphical representation 150 appears on the web page as a key for interpreting information included under bid status 121. Depending upon the status of a bid in any particular market, either the winning bid box, 152, the outbid box 154 or the partial win box 156 are used to graphically represent the status of a bid under the bid status parameter 121. These boxes are not used to represent the status of a bid under the parameter associated with bid status 141 because bidding has not yet started.

In other embodiments, the graphical representation 150 appears on other web pages presented by an electronic trading hub, including the following:

web pages that summarize the activities of a buyer, a seller, an owner or a negotiator web pages presenting information about a single transaction web pages that present information related status updates other web pages that present information about trading activities.

In other embodiments, the partial win box 156 provides information to a user that is responsive to a partial win with respect to price, quantity, phase of bidding (for example, if the user won one phase of a multi-stage bidding event) or other aspects of a transaction.

Figure 2:
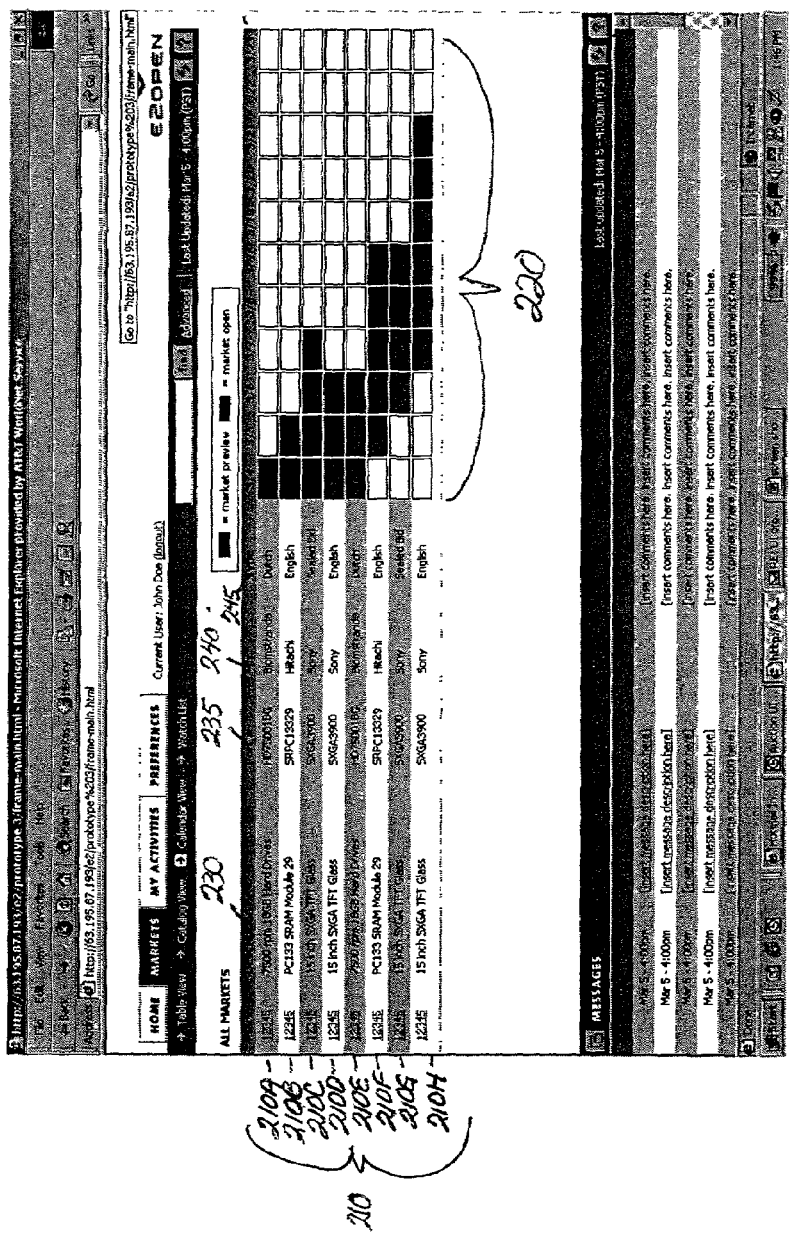
FIG. 2 shows an exemplary web page that includes a graphical representation of on-going and future markets such as may be of interest to a user.

FIG. 2 shows an exemplary web page including a graphical representation of on-going and future markets such as may be of interest to a user.

A web page 200 includes a display of a set of markets 210 and a temporal status representation 220. The web page 200 further includes at least some of the following: an event descriptor 230, a part indicator 235, a manufacturer indicator 240 and a market type indicator 245.

The set of markets 210 includes a table of those markets in which a user has bid or is likely to bid. For purposes of illustration, the eight markets shown in this exemplary set of markets 210 are designated 210A–210H.

The temporal status representation 220 includes a graphical representation indicating the dates or times during which the market will be open for bidding or negotiating. This information is used by a bidder to schedule bids in a timely manner. For example, in FIG. 200, markets 210A, 210B, 210C, 210D and 210E are open for bidding. Market 210A is scheduled to close shortly and market 210C will close in several days. Markets 210F, 210G and 210H are not yet open for bidding.

In other embodiments, the web page 200 is also used to provide additional information relating to the progress of one or more markets 210. In such embodiments, the temporal status representation 220 is used to identify a particular stage of a multiphase auction (please see application Ser. No. 10/087,444, filed Mar. 1, 2002, in the name of inventor Erik Stuart, titled "On-Line Auction with Different Rules Applicable to Different Phases", for more information on multiphase events). In other embodiments, the temporal status representation 220 identifies whether the auction has gone into overtime bidding, whether preliminary bidding is taking place or whether certain rules associated with a particular time are being implemented. This is particular useful when the market involves a multi-stage auction.

In other embodiments, the temporal status representation 220 includes a countdown clock that measures the time until another event of importance occurs. Such events may include at least one of the following:

time until the next bid in a Dutch auction time until the next phase in a multi-phase bidding event time until the end of bidding time until the commencement of bidding time until overtime runs out.

In various embodiments, this count-down clock may measure the passing of time by counting up to a stated time or by counting down to a zero time.

If an ongoing market in the set of markets 210 has an ambiguous end time (for example, the market involves a Dutch auction), the end time is displayed as the last unit of time that includes the current time or the starting time, whichever is later. For example, if the temporal status representation 220 is measured in days (as in FIG. 200), then the end time will be marked as the current day. If the market in the set of markets 210 has not yet begun, then the end time is displayed as one unit of time after the start time.

The event descriptor 230 includes such information as may readily identify the market for a user. Although this generally includes the name of the part (for example, a 15 inch SVGA TFT Glass), other event descriptors 230 may include thumbnail photographs or drawings of a particular component.

The part indicator 235 provides additional information concerning the item being bid for. In one embodiment, the part indicator 235 refers to the manufacturer's part number. In other embodiments, the part indicator 235 indicates includes an internal numbering system such as may be readily understood by users or the hub.

The manufacturer indicator 240 indicates the manufacturer of the good being sold. This is particularly useful when the manufacturer of the goods is different from the seller of the goods.

The market type indicator 245 indicates what type of markets are included in the set of markets 210. These markets include at least some of the following: English auctions, open RFBs (request for bids), Dutch auctions, sealed RFBs and other negotiations.

Figure 3:
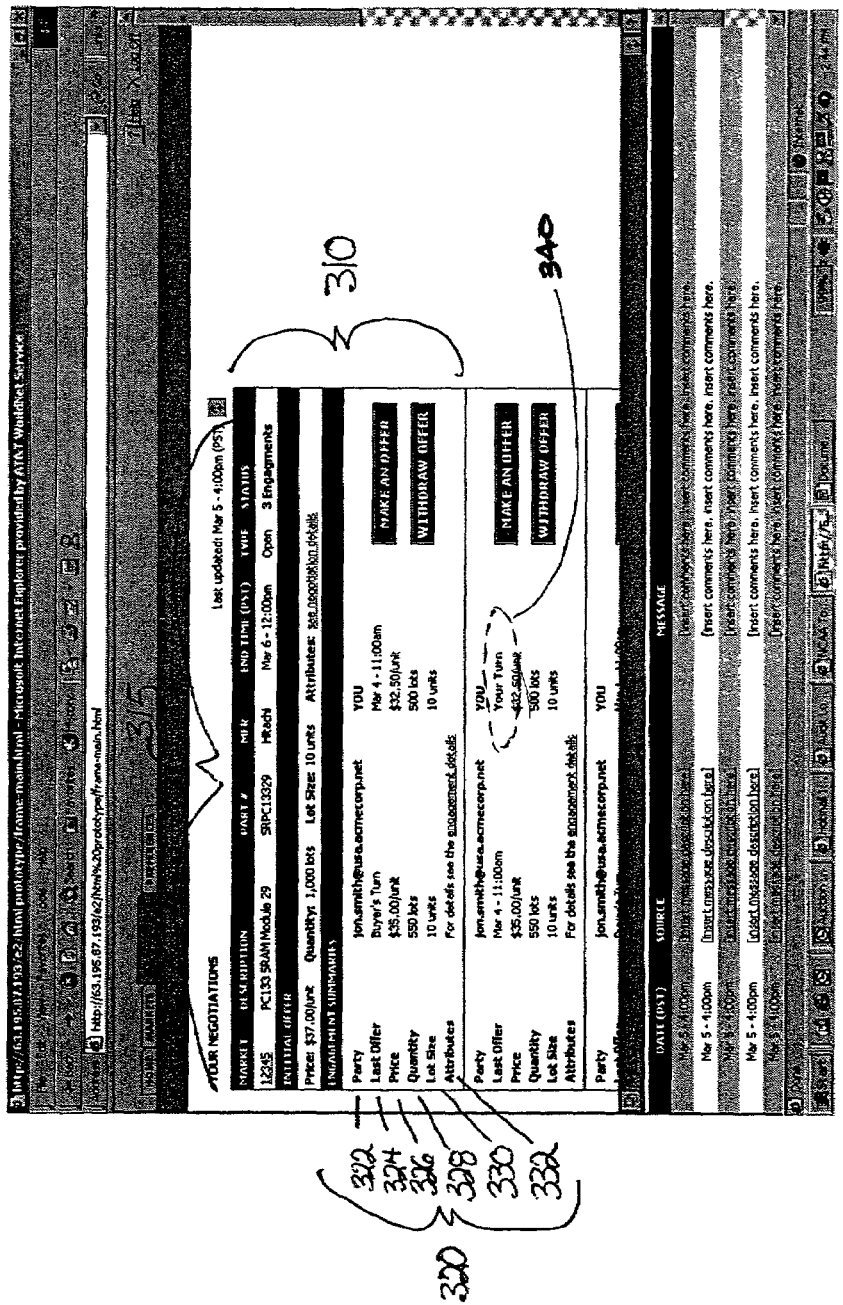
FIG. 3 shows an exemplary web page that includes a tabular representation of activities occurring in markets, including an indicator that shows whose turn it is to bid.

FIG. 3 shows an exemplary web page that includes a tabular representation of negotiations, including an indicator that shows whose turn it is.

A web page 300 includes at least one market summary 310. The market summary 310 includes a set of market identifier data fields 315 and a set of offer detail data fields 320. Although web page 300 describes a negotiation, the set of market identifier data fields 315 and the set of offer detail data fields 320 can also be used to describe requests for bids, English auctions, Dutch auctions and other types of transactions.

The set of market identifier data fields 315 includes sufficient information to clearly identify which market is being summarized. This information includes at least some of the following: the market number, what is being sold, the party number, manufacturer, end time, type of market and status.

The set of offer detail data fields 320 includes data fields associated with party 322, last offer 324, price 326, quantity 328, lot size 330 and attributes 332.

Party 322 refers to the identity of the parties who are bidding. The market summary 310 on the top of web page 300 identifies the bidding parties as John Smith and the user. Some contact information (for example, an email address, fax number or telephone number) associated with the parties may also be included.

Last offer 324 describes the date and time the most recent offer was made and an indicator 340 of whose turn it is to bid. In various embodiments, the indicator 340 could indicate "Your Turn", "Seller's Turn", "Buyer's Turn", "Owner's Turn" or similar identifiers relating to the status of the bidding. In the first set of offer details 320 shown on the top of web page 300, it is the seller's turn to bid. The most recent bid was made by the user of this page on March $4^{th}$ at 11:00 AM.

In one embodiment, if the indicator 340 indicates "Your Turn", then the other party has made the last offer and it would be appropriate for the user to respond. In another embodiment, if the indicator 340 indicates "Your Turn", then at least one criteria with respect to price, quantity or some other variable has been met.

If the indicator 340 indicates a status other than "Your Turn", then the last party to bid is the user and it would not be appropriate for the user to respond again at this time. In other embodiments, if the indicator 340 indicates a status other than "Your Turn", then at least one criteria with respect to price, quantity or other variable has not been met (i.e. the counter-party has accepted at least in part).

In other embodiments, the indicator 340 is responsive to aggregated information about a number of markets, rather than just a single market. In such embodiments, indicator 340 is responsive to threshold such as may be selected by a user. For example, indicator 340 indicates that it is a particular bidder's turn only if it is their turn in a selected number of markets rather than just one (for example, ten or more such markets). Similarly, indicator 340 may indicate that it is a bidder's turn if the bidding exceeds a specific quantity or other aspect of bidding that is important to the bidder.

Price 336 and quantity 328 refer to the most recent price and quantity bid for by the respective parties. Price 326 and quantity shown on the top of web page 300 reveal that the most recent bid by Jon Smith was $35.00/unit for 550 units and the most recent bid by the user was $32.50/unit for 500 units.

Lot size 330 defines the number of units in a lot. This is similar to lot size 117. The lot size 117 describes number of items in the units being sold. Information associated with lot size 117 helps the buyer understand exactly how many items they will receive so that a bid can be tailored accordingly.

Attributes 332 provides additional information such as may be available in a database associated with the hub. This information may include information on past transactions, credit information associated with the parties, additional information on the goods being marketed and other attributes that are relevant to the transaction.

ALTERNATIVE EMBODIMENTS

Although preferred embodiments are disclosed herein, many variations are possible which remain within the concept, scope and spirit of the invention; these variations would be clear to those skilled in the art after perusal of this application.

The invention claimed is:

1. A graphical user interface provided by an electronic hub for presenting information to a user, said information including
   a first set of data fields with information identifying one or more markets, negotiations, or markets and negotiations to which said user has been invited; and
   a second set of data fields with information summarizing bids that have occurred in at least one of said one or more markets, negotiations, or markets and negotiations, wherein said second set of data fields includes a field for identifying whose turn it is presently;
   wherein said field for identifying whose turn it is presently is responsive to a number of said one or more markets, negotiations, or markets and negotiations in which it is said user's turn.

2. A graphical user interface as in claim 1, wherein said field for identifying whose turn it is presently indicates that another party made a last offer and that it would be appropriate for said user to respond.

3. A graphical user interface as in claim 1, wherein said field for identifying whose turn it is presently indicates that specific criteria with respect to price, quantity, or other variable specified by said user has been met.

4. A graphical user interface as in claim 1, wherein said field for identifying whose turn it is presently indicates that specific criteria with respect to price, quantity, or other variable specified by said user have not been met.

5. A graphical user interface as in claim 1, wherein said field for identifying whose turn it is presently is responsive to a combination of criteria related to at least one of said one or more markets, negotiations, or markets and negotiations and a set of outstanding bids.

6. A graphical user interface as in claim 1, further comprising a mechanism for manipulating elements in at least one of said first set of data fields and said second set of data fields, so as to sort said elements based upon different aspects of said one or more markets, negotiations, or markets and negotiations, wherein said elements include at least lot size, price, time, and status of party.

7. A graphical user interface as in claim 1, further comprising an indicator for providing information about whose turn it is to bid in at least one of said markets and negotiations.

8. A method of providing a graphical user interface for an electronic hub for presenting information to a user, comprising:
   graphically presenting a first set of data fields with information identifying one or more markets, negotiations, or markets and negotiations to which said user has been invited; and
   graphically presenting a second set of data fields with information summarizing bids that have occurred in at least one of said one or more markets, negotiations, or markets and negotiations, wherein said second set of data fields includes a field for identifying whose turn it is presently;
   wherein said field for identifying whose turn it is presently is responsive to a number of said one or more markets in which it is said user's turn.

9. A method as in claim 8, wherein said field for identifying whose turn it is presently indicates that another party made a last offer and that it would be appropriate for said user to respond.

10. A method as in claim 8, wherein said field for identifying whose turn it is presently indicates that specific criteria with respect to price, quantity, or other variable specified by said user has been met.

11. A method as in claim 8, wherein said field for identifying whose turn it is presently indicates that specific criteria with respect to price, quantity, or other variable specified by said user have not been met.

12. A method as in claim 8, wherein said field for identifying whose turn it is presently is responsive to a combination of criteria related to at least one of said one or more markets, negotiations, or markets and negotiations and a set of outstanding bids.

13. A method as in claim 8, further comprising the step of manipulating elements in at least one of said first set of data fields and said second set of data fields, so as to sort said elements based upon different aspects of said one or more markets, negotiations, or markets and negotiations, wherein said elements in said set of tables includes lot size, price, time, and status of party.

14. A method as in claim 8, further comprising the step of graphically presenting an indicator for providing information about whose turn it is to bid in at least one of said markets and negotiations.

\* \* \* \* \*